(12) United States Patent
Shibayama et al.

(10) Patent No.: US 7,972,715 B2
(45) Date of Patent: Jul. 5, 2011

(54) GLASS SUBSTRATE AND THERMAL-ASSISTED MAGNETIC RECORDING DISK

(75) Inventors: Norihisa Shibayama, Tokyo (JP); Yasuhiro Naka, Tokyo (JP); Nobuaki Orita, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 118 days.

(21) Appl. No.: 12/367,632

(22) Filed: Feb. 9, 2009

(65) Prior Publication Data

US 2009/0239101 A1    Sep. 24, 2009

(30) Foreign Application Priority Data

Mar. 24, 2008   (JP) ................ 2008-075909

(51) Int. Cl.
   *G11B 5/70*  (2006.01)
   *G11B 5/82*  (2006.01)
   *G21G 4/00*  (2006.01)
(52) U.S. Cl. ............. 428/831.2; 428/826; 428/848; 428/846.9; 360/59
(58) Field of Classification Search .......... 428/800, 428/826, 848, 141, 64.3, 329, 831.2, 846.9; 360/135, 48, 59, 314, 77.02; 65/61; 501/94, 501/95

See application file for complete search history.

(56) References Cited

U.S. PATENT DOCUMENTS

| 7,548,398 | B2 * | 6/2009 | Kamimura et al. ......... 360/135 |
| 2002/0197437 | A1 * | 12/2002 | Hashimoto et al. ........ 428/64.3 |
| 2003/0113512 | A1 * | 6/2003 | Watanabe et al. ........... 428/141 |
| 2003/0194583 | A1 * | 10/2003 | Miyamoto ................... 428/848 |
| 2003/0211362 | A1 * | 11/2003 | Ohno ............................ 428/848 |
| 2003/0211365 | A1 * | 11/2003 | Hagan et al. ................. 428/695 |
| 2004/0219353 | A1 * | 11/2004 | Harasawa et al. ........... 428/329 |
| 2005/0153104 | A1 * | 7/2005 | Gillis et al. .................. 428/156 |
| 2005/0202287 | A1 * | 9/2005 | Lu et al. .................... 428/831.2 |
| 2005/0214583 | A1 * | 9/2005 | Ito et al. ...................... 428/800 |
| 2005/0223744 | A1 * | 10/2005 | Horisaka et al. ................ 65/61 |
| 2006/0292400 | A1 * | 12/2006 | Suwa et al. ................... 428/826 |
| 2007/0109678 | A1 * | 5/2007 | Kamimura et al. ............ 360/48 |
| 2008/0049359 | A1 * | 2/2008 | Tsuchiyama et al. ........ 360/135 |
| 2008/0090104 | A1 * | 4/2008 | Sonobe et al. ............... 428/800 |

FOREIGN PATENT DOCUMENTS

| JP | 2000-200414 | 7/2000 |
| JP | 2007-134004 | 5/2007 |

* cited by examiner

*Primary Examiner* — Kevin M. Bernatz
*Assistant Examiner* — Louis Falasco
(74) *Attorney, Agent, or Firm* — Oblon, Spivak, McClelland, Maier & Neustadt, L.L.P.

(57) ABSTRACT

A plurality of recording magnetization portions is arranged in a concentric manner around a center of a glass substrate. A plurality of non-magnetization portion having a thermal conductivity lower than that of the recording magnetization portions is formed each between adjacent recording magnetization portions along a circumferential direction on a main surface of the glass substrate. A mean squared roughness of a surface of an area where each of the non-magnetization portions is formed is equal to or smaller than 1 nanometer.

5 Claims, 2 Drawing Sheets

|  | Rmax [nm] | Ra [nm] | Rq [nm] | $T_1-T_2$ [°C] | JUDGEMENT |
|---|---|---|---|---|---|
| EMBODIMENT EXAMPLE 1 | 15 | 1 | 1 | 150 | GOOD |
| EMBODIMENT EXAMPLE 2 | 15 | 1 | 0.1 | 152 | GOOD |
| EMBODIMENT EXAMPLE 3 | 15 | 1 | 0.5 | 151 | GOOD |
| COMPARISON EXAMPLE 1 | 15 | 1 | 5 | 139 | BAD |

GLASS SUBSTRATE AND THERMAL-ASSISTED MAGNETIC RECORDING DISK

BACKGROUND OF THE INVENTION

1. Field of the Invention

The present invention relates to a glass substrate for manufacturing a thermal-assisted magnetic recording disk and a thermal-assisted magnetic recording disk.

2. Description of the Related Art

With an increase of amount of information to be handled in the recent information processing, the recording capacity of a magnetic recording disk such as the hard disk is increased with each passing year, with which the recording density of the magnetic recording disk is also increased year after year. For example, in recent years, even a magnetic recording disk having an ultra-high recording density of 100 gigabytes per inch has been developed.

As a method of realizing the high recording density, it is often employed to lower the flying height of the magnetic head from the main surface of the magnetic recording disk. However, if there is an undulation with a period such that the magnetic head cannot approach the main surface of the magnetic recording disk, the flying height cannot be set beyond the surface roughness. To cope with the problem, for example, a technology for lowering the flying height is disclosed in Japanese Patent Application Laid-open No. 2000-200414, by suppressing the surface roughness of a glass substrate that becomes a base material for the magnetic recording disk with the average roughness of equal to or smaller than 1 nanometer and the maximum roughness of equal to or smaller than 15 nanometers.

Another method of realizing the high recording density includes a method of using a thermal-assisted magnetic recording system. In this method, when performing a magnetic recording, a laser device installed at near field illuminates an area where information is to be recorded with a laser light to lower the coercivity by increasing the temperature of the area, so that the magnetization of the area by the magnetic head becomes easy. By employing this method, because the recording magnetic portion can be formed using magnetic material having a high stead-state coercivity, it is possible to increase the recording density by narrowing the width of each recording track of a magnetic recording disk while preventing a loss of magnetization due to thermal fluctuation. Hereinafter, the magnetic recording disk employing the thermal-assisted magnetic recording method is referred to as a thermal-assisted magnetic recording disk.

However, in the thermal-assisted magnetic recording method, the temperature-elevated area is spread beyond the area where the recording is performed due to the thermal diffusion. As a result, a partial magnetization occurs also in a track adjacent to the recording track, resulting in a possibility of leading a degradation or a loss of data in the adjacent track, which is called the cross write. To cope with this problem, for example, in Japanese Patent Application Laid-open No. 2007-134004, a technology is disclosed in which the cross write is prevented by keeping an area where the temperature is elevated by the laser illumination from being spread to an adjacent recording track by separating each recording track with a non-magnetization portion having a thermal conductivity equal to or lower than one hundredth of that of the recording track.

Nevertheless, the conventional thermal-assisted magnetic recording disk still has a problem of the cross write even when the non-magnetization portion is provided between the recording tracks.

SUMMARY OF THE INVENTION

It is an object of the present invention to at least partially solve the problems in the conventional technology.

According to one aspect of the present invention, there is provided a glass substrate for fabricating a thermal-assisted magnetic recording disk by forming a plurality of recording magnetization portions arranged in a concentric manner around a center of the glass substrate and a plurality of non-magnetization portions having a thermal conductivity lower than that of the recording magnetization portions each between adjacent recording magnetization portions along a circumferential direction on a main surface of the glass substrate. A mean squared roughness of a surface of an area where each of the non-magnetization portions is formed is equal to or smaller than 1 nanometer.

Furthermore, according to another aspect of the present invention, there is provided a thermal-assisted magnetic recording disk including a glass substrate; a plurality of recording magnetization portions arranged in a concentric manner around a center of the glass substrate; and a plurality of non-magnetization portions having a thermal conductivity lower than that of the recording magnetization portions each between adjacent recording magnetization portions along a circumferential direction on a main surface of the glass substrate. A mean squared roughness of a surface of an area where each of the non-magnetization portions is formed is equal to or smaller than 1 nanometer.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of a glass substrate and a thermal-assisted magnetic recording disk according to the present invention will be explained in detail below with reference to the accompanying drawings. It should be mentioned that the present invention is not to be considered limited to the embodiments.

Figure 1:
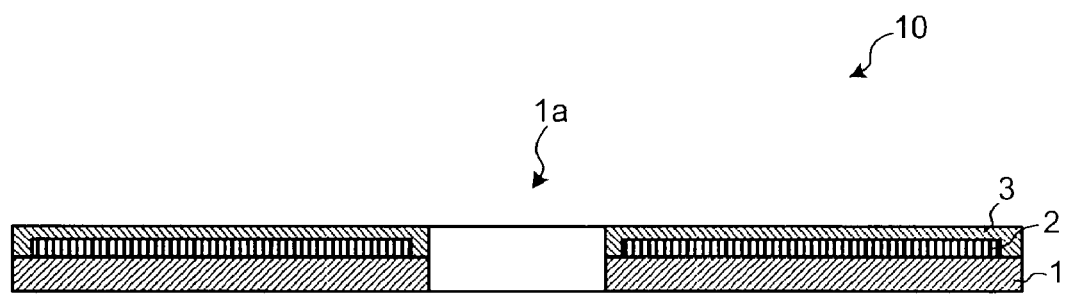
FIG. 1 is a schematic cross sectional diagram of a thermal-assisted magnetic recording disk according to an embodiment of the present invention.

FIG. 1 is a schematic cross sectional diagram of a thermal-assisted magnetic recording disk 10 according to an embodiment of the present invention. As shown in FIG. 1, the thermal-assisted magnetic recording disk 10 (hereinafter, "magnetic recording disk 10") includes a glass substrate 1 having a hole 1a at its center, a recording layer 2, and a protecting layer 3. The recording layer 2 and the protecting layer 3 are formed on the main surface of the glass substrate 1.

The glass substrate 1 can be fabricated using, for example, glass ceramics such as amorphous glass and crystallized glass. However, based on a perspective of moldability and workability, it is preferable to use the amorphous glass. For example, it is desirable to use alumino-silicate glass, soda-lime glass, soda-lime alumino silicate glass, alumino-boro-silicate glass, boro-silicate glass, air-cooling-treated or liquid-cooling treated physical tempered glass, or chemical tempered glass.

The protecting layer 3 is for protecting the recording layer 2 from the outside environment and is formed with dielectric material that is optically transparent with respect to a light having a wavelength of 400 nanometers, which is the wavelength of a laser light used in the thermal-assisted magnetic recording method, such as silicon nitride (SiN) and silicon dioxide ($SiO_2$).

Figure 2:
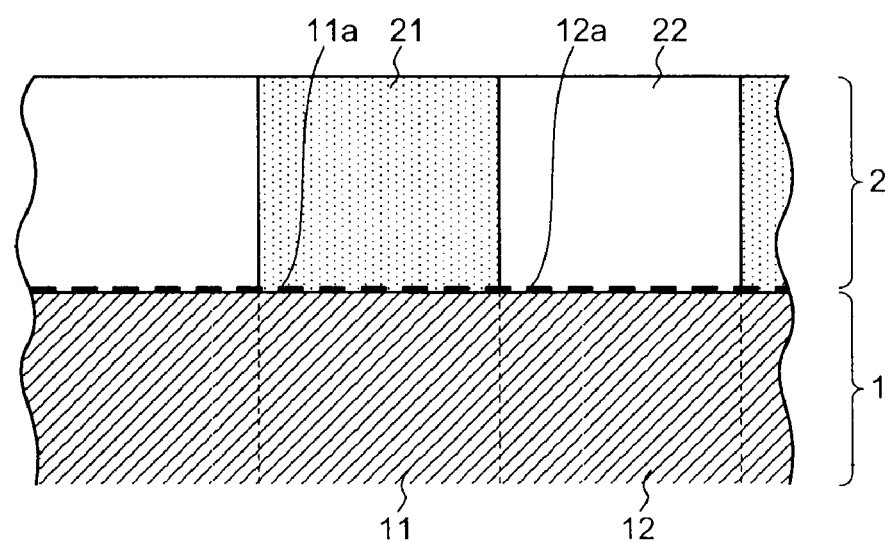
FIG. 2 is a partial enlarged view of a boundary between a glass substrate and a recording layer in the thermal-assisted magnetic recording disk shown in FIG. 1.

FIG. 2 is a partial enlarged view of a boundary between the glass substrate 1 and the recording layer 2 in the magnetic recording disk 10 shown in FIG. 1. As shown in FIG. 2, the recording layer 2 includes a plurality of recording magnetization portions 21 and a plurality of non-magnetization portions 22.

Each of the recording magnetization portions 21 is formed in a concentric manner around the hole 1a on a surface 11a of an area 11 of the glass substrate 1 to form a recording track of the magnetic recording disk 10. Each of the recording magnetization portions 21 is formed with magnetic material such as Co alloy, Fe alloy, or Tb—Co based rare earth transition metal amorphous alloy. Each of the recording magnetization portions 21 has a width of, for example, 140 nanometers and a thickness of, for example, 30 nanometers.

Each of the non-magnetization portions 22 is formed in a concentric manner around the hole 1a on a surface 12a of an area 12 of the glass substrate 1, in a similar manner to each of the recording magnetization portions 21, and intervenes between the recording magnetization portions 21 along the circumferential direction. Each of the non-magnetization portions 22 is formed with dielectric material that is optically transparent with respect to a light having a wavelength of 400 nanometers, which is the wavelength of a laser light used in the thermal-assisted magnetic recording method, such as SiN and $SiO_2$. Each of the non-magnetization portions 22 has a width, for example, 30 nanometers to 140 nanometers and a thickness of, for example, 30 nanometers. The thermal conductivity of each of the non-magnetization portions 22 is lower than the thermal conductivity of each of the recording magnetization portions 21, preferably be equal to or lower than one hundredth of the thermal conductivity of each of the recording magnetization portions 21, for example, $1 \times 10^{-3}$ W/(m·K) to 1 W/(m·K).

When recording information on the magnetic recording disk 10, an area of the recording magnetization portion 21 where the information is to be recorded is illuminated with a laser light to increase the temperature, and a magnetization is performed by a magnetic head in a state in which the coercivity of the area is lowered.

At this time, because the thermal conductivity of the non-magnetization portion 22 of the magnetic recording disk 10 is low, a spread of the temperature-elevated area of the recording magnetization portion 21 due to the thermal diffusion to the adjacent recording magnetization portion 21 is suppressed, and as a result, the cross write is suppressed.

In addition, because the mean squared roughness of the surface 12a of the area 12 of the magnetic recording disk 10 where the non-magnetization portion 22 is formed is equal to or smaller than 1 nanometer, the temperature rise of the non-magnetization portion 22 is prevented at the time of a laser illumination, and as a result, the cross write is more definitely suppressed.

Figures 3, 4:
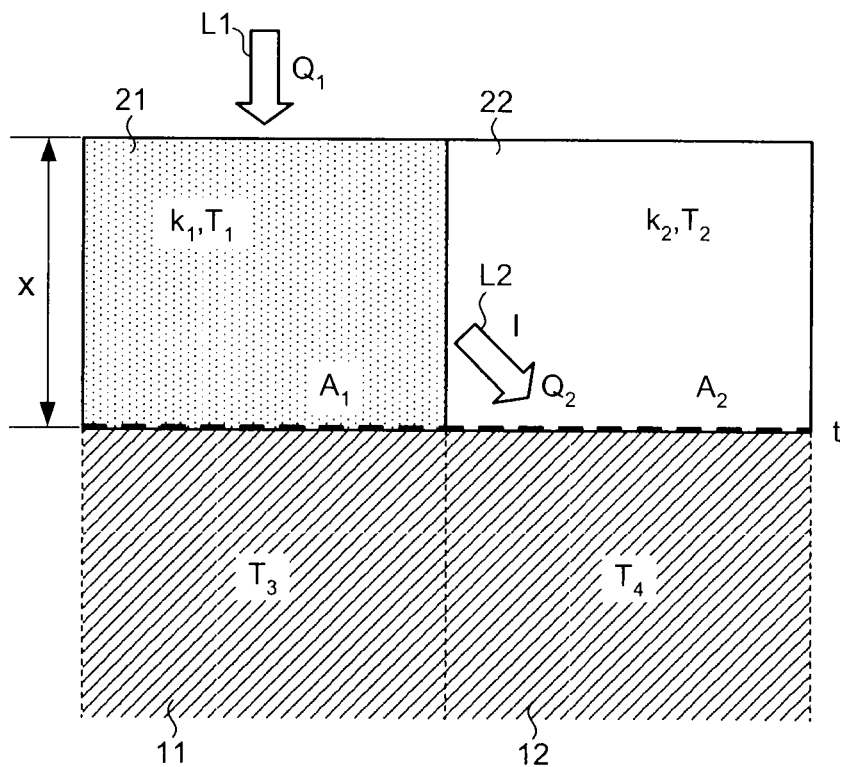
FIG. 3 is a schematic diagram for explaining a mechanism of operation of the present invention.
FIG. 4 is a table showing the maximum roughness Rmax, the average roughness Ra, the mean squared roughness Rq, the temperature difference $T_1-T_2$ between a recording magnetization portion and a non-magnetization portion, and the result of judging occurrence of the cross write of magnetic recording disks according to embodiment examples 1 to 3 and a comparison example 1.

FIG. 3 is a schematic diagram for explaining a mechanism of operation of the present invention. A laser light L1 illuminated on the area of the recording magnetization portion 21 where the information is to be recorded causes the temperature of the area to be elevated. The thermal conduction in the recording magnetization portion 21 is expressed by Equation (1), where $Q_1$ is incident energy on the recording magnetization portion 21 from the illumination of the laser light L1, $T_1$ is temperature of the recording magnetization portion 21, $k_1$ is thermal conductivity of the recording magnetization portion 21, $T_3$ is temperature of the area 11 of the glass substrate 1, $A_1$ is contact area between the recording magnetization portion 21 and the area 11, and x is thickness of the recording magnetization portion 21.

$$Q_1 = k_1 A_1 \frac{T_1 - T_3}{x} \tag{1}$$

Between the temperature-elevated recording magnetization portion 21 and the non-magnetization portion 22, the thermal conduction is low because there is a difference in the thermal conductivity. On the other hand, a thermal radiation L2 is generated from the recording magnetization portion 21. The intensity I of the thermal radiation L2 is expressed by Equation (2), where a is a constant that is dependent on the material of the recording magnetization portion 21.

$$I = a T_1^4 \tag{2}$$

When the thermal radiation L2 reaches the surface 12a of the area 12 where the non-magnetization portion 22 is formed, a part of the thermal radiation L2 is converted into a heat due to the surface roughness of the surface 12a. The amount of heat generated at this time is expressed by Equation (3), where A2 is the contact area between the non-magnetization portion 22 and the area 12, $\alpha$ is a coefficient that is dependent on the material of the glass substrate 1, and t is the mean squared roughness of the surface 12a.

$$Q_2 = A_2 I (1 - e^{-\alpha t}) \tag{3}$$

The thermal conduction in the non-magnetization portion 22 is expressed by Equation (4), where $k_2$ is the thermal conductivity of the non-magnetization portion 22, $A_2$ is the contact area between the non-magnetization portion 22 and the area 12, $T_2$ is the temperature of the non-magnetization portion 22, and $T_4$ is the temperature of the area 12 of the glass substrate 1.

$$Q_2 = k_2 A_2 \frac{T_2 - T_4}{x} \tag{4}$$

The temperature T4 can be estimated by Equation (5).

$$T_4 = \frac{T_1 + T_3}{2} \tag{5}$$

Therefore, by using the above equations, the temperature $T_2$ cab be expressed by Equation (6).

$$T_2 = \frac{xa}{k_2}(1 - e^{-at})T_1^4 + T_1 - \frac{Q_1 x}{2k_1 A_1} \tag{6}$$

As shown in Equation (6), the temperature $T_2$ of the non-magnetization portion 22 is dependent on the mean squared roughness t of the surface 12a of the area 12 where the non-magnetization portion 22 is formed. Therefore, if the mean squared roughness t is decreased, the temperature $T_2$ is decreased. If the mean squared roughness t is equal to or smaller than 1 nanometer, the temperature $T_2$ becomes sufficiently low, and as a result, the cross write can be more definitely suppressed.

It means that the above result can be obtained if the mean squared roughness t is equal to or smaller than 1 nanometer, and the means squared roughness of the surface 11a of the area 11 where the recording magnetization portion 21 is formed is not particularly limited.

In addition, if the surfaces 11a and 12a of the areas 11 and 12 where the recording magnetization portion 21 and the non-magnetization portion 22 are formed, respectively, have an average roughness equal to or smaller than 1 nanometer and the maximum roughness equal to or smaller than 15 nanometers, the flying height of the magnetic head can be kept low, which is desirable because the recording density can be increased.

The glass substrate 1 having the mean squared roughness equal to or smaller than 1 nanometer can be fabricated as follows. A coring is performed on a glass plate that is a raw material to mold an annular-shaped glass substrate. The molded glass substrate is lapped using a known lapping machine that can lap both surfaces of the glass substrate at the same time. Then, the lapped glass substrate is polished to finally fabricate the glass substrate 1 having a desired thickness.

When fabricating the glass plate as the raw material, a redraw method, in which a preform glass plate fabricated using a float method or the like is softened by heating the preform glass plate and drawn in a desired thickness, is employed, as disclosed in Japanese Patent Application Laid-open No. H11-199255, it is more preferable because a glass plate having an extremely small mean squared roughness can be easily fabricated.

Embodiment examples and comparison examples of the present invention are explained below. However, the present invention is not to be considered limited to the embodiment examples.

A 643-micrometer-thick glass plate made of alumino-silicate glass is fabricated using the redraw method, and an annular-shaped glass substrate is molded with the outer diameter of 65 millimeters and the inner diameter of 20 millimeters by coring the glass plate. A lapping and a polishing are performed on the glass substrate using a commercially available lapping and polishing machine with a plurality of different lapping and polishing conditions, and finally a 636-micrometer-thick glass substrate is fabricated.

The surface roughness of the fabricated glass substrate is measured using an atomic force microscope, and four glass substrates having the maximum roughness of 15 nanometers, the average roughness of 1 nanometer, and different mean squared roughness with one another are selected. A recording magnetization portion made of Co alloy having a thickness of 30 nanometers and a width of 140 nanometers is formed on the main surface of the glass substrate in a plurality of tracks. A non-magnetization portion made of SiN having a thickness of 30 nanometers and a width of 140 nanometers is formed between the tracks, and a protecting layer is formed, to fabricate magnetic recording disks according to embodiment examples 1 to 3 and a comparison example 1. The mean squared roughness of the magnetic recording disks are 1 nanometer, 0.1 nanometer, and 0.5 nanometer for the embodiment examples 1 to 3, respectively, and 5 nanometers for the comparison example 1.

An experiment of confirming an occurrence of the cross write is performed by applying the fabricated magnetic recording disks in a magnetic recording disk device. In this experiment, the wavelength and the power of a laser light is 400 nanometers and 0.5 milliwatt, respectively. And then, the temperatures of a recording magnetization portion and a non-magnetization portion are obtained when the recording magnetization portion is illuminated with the laser light.

FIG. 4 is a table showing the maximum roughness Rmax, the average roughness Ra, the mean squared roughness Rq, the temperature difference $T_1-T_2$ between a recording magnetization portion and a non-magnetization portion, and the result of judging occurrence of the cross write of magnetic recording disks according to the embodiment examples 1 to 3 and the comparison example 1. As shown in FIG. 4, in the cases of the embodiment examples 1 to 3, the temperature difference $T_1-T_2$ is as large as equal to or higher than 150° C., and the cross write does not occur, resulting in a judgment of "GOOD" in all cases. However, in the case of the comparison example 1, the temperature difference $T_1-T_2$ is as small as 150° C., and the cross write occurs, resulting in a judgment of "BAD".

As described above, according to one aspect of the present invention, because the mean squared roughness of the surface area where the non-magnetization portion is to be formed is equal to or smaller than 1 nanometer, the temperature rise of the non-magnetization portion when the recording magnetization portion is illuminated with a laser is prevented. Therefore, it is possible to realize a glass substrate for manufacturing a thermal-assisted magnetic recording disk with a capability of definitely preventing the occurrence of the cross write and a thermal-assisted magnetic recording disk.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A thermal-assisted magnetic recording disk comprising:
a disk-like glass substrate; and
a recording layer formed on a main surface of the glass substrate, the recording layer including a plurality of recording magnetization portions arranged in a concentric manner around a center of the glass substrate and a plurality of non-magnetization portions having a thermal conductivity lower than that of the recording magnetization portions, each of the non-magnetization portions being disposed between adjacent recording magnetization portions along a circumferential direction on the main surface of the glass substrate, wherein a mean squared roughness of a first area of the main surface of the glass substrate where each of the non-magnetization portions is formed is equal to or smaller than 1 nanometer, a width of each of the non-magnetization portions is between 30 nanometers and 140 nanometers, and a thermal conductivity of each of the non-magnetization portions is equal to or lower than one hundredth of a thermal conductivity of each of the recording magnetization portions and in a range from $1 \times 10^{-3}$ W/(m·K) to 1 W/(m·K).

2. The thermal-assisted magnetic recording disk according to claim 1, wherein an average roughness of each of a second area of the main surface of the glass substrate where each of the recording magnetization portions is formed and the first area is equal to or smaller than 1 nanometer, and a maximum roughness of each of the first area and the second area of the main surface is equal to or smaller than 15 nanometers.

3. The thermal-assisted magnetic recording disk according to claim 1, wherein a difference of temperature between each of the non-magnetization portions and each of the recording magnetization portions is equal to or higher than 150° C. when each of the recording magnetization portions are illuminated with a laser light.

4. The thermal-assisted magnetic recording disk according to claim 1, further comprising a protecting layer formed on the recording layer, wherein the protecting layer is formed with a dielectric material that is optically transparent with respect to a laser light.

5. The thermal-assisted magnetic recording disk according to claim 4, wherein the dielectric material is optically transparent with respect to the laser light having a wavelength of 400 nanometers.

* * * * *